M. J. KEATING.
FRUIT PICKER.
APPLICATION FILED MAY 22, 1908.
964,788.
Patented July 19, 1910.
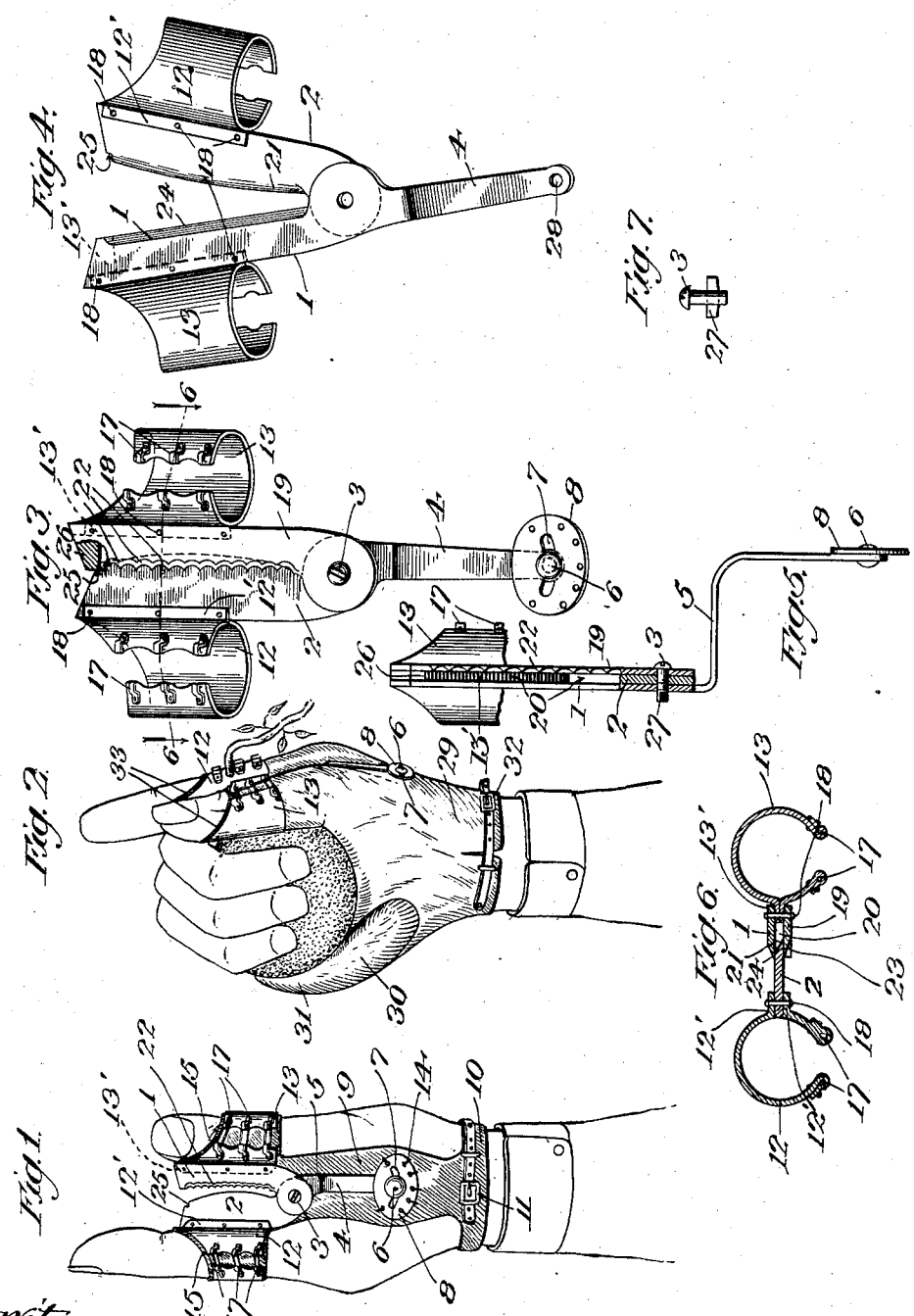
Witnesses:
Frank L. Graham.
Louis W. Graty.
Inventor:
Maurice J. Keating.
Townsend Hauett Hackley
Attorneys
THE NORRIS PETERS CO., WASHINGTON, D. C.

UNITED STATES PATENT OFFICE.

MAURICE J. KEATING, OF SAWTELLE, CALIFORNIA, ASSIGNOR TO ALBERT R. MULLER, OF SAWTELLE, CALIFORNIA.

FRUIT-PICKER.

964,788.   Specification of Letters Patent.   Patented July 19, 1910.

Application filed May 22, 1908.   Serial No. 434,415.

*To all whom it may concern:*

Be it known that I, MAURICE J. KEATING, a citizen of the United States, residing at Sawtelle, in the county of Los Angeles and State of California, have invented new and useful Improvements in Fruit-Pickers, of which the following is a specification.

This invention relates to fruit pickers, and has for one of its objects to provide a simple, cheap and convenient form of picker by means of which the fruit can be quickly and easily severed from the tree.

Another object is to provide means for attaching the picker or cutter to the hand of the operator whereby the fruit may be held in the hand while it is being cut from the tree.

Another object is to provide means for limiting the movement of the cutting blade and also to provide for preventing the stem from slipping while it is being cut.

The accompanying drawings illustrate the invention and form a part of this specification.

Figure 1 is a side elevation of my picker in its simplest form showing it secured to the left hand in position for being operated. Fig. 2 is a perspective view of the right hand of an operator provided with a picker showing the cutter secured to a glove and the fruit grasped in the hand after having been cut off. Fig. 3 is a side elevation of the metal portion of the cutter closed. Fig. 4 is a plan view of the cutting members from the reverse side of Fig. 3, showing the cutter open. Fig. 5 is a longitudinal sectional view through the cutters showing one of the retaining means partly broken away. Fig. 6 is a transverse sectional view on lines 6—6 in Fig. 3 looking in the direction of the arrow. Fig. 7 is a detail view of the pivot pin.

Referring more particularly to the drawings which are for illustrative purposes only, and, therefore, are not drawn to any particular scale, 1 and 2 indicate two scissors-like members which are pivotally secured together by means of a pivot or pin 3. One of said members is preferably longer than the other and is provided with a shank 4 which is preferably bent or off-set as at 5 and extended back a sufficient distance where it is provided with a head or rivet 6 that is adapted to be slidably mounted in a slot 7 of a plate 8. These two members are adapted to be secured to the hand of an operator so as to lie between the thumb and first finger as shown in Figs. 1 and 2 of the drawings. In the form of device shown in Fig. 1 a strip 9 of leather or other suitable material is adapted to be secured around the wrist of the operator in any desired manner as by means of a wrist band 10 and strap and buckle connection 11. The forward end of said strip extends to the forward ends of the cutter where it is connected with what I shall call finger plates 12 and 13, preferably by projecting through them similar to the fingers of a glove. The plate 8 is secured to the strip 9 in any suitable manner as by stitches 14 and the plates 12 and 13 are substantially cylindrical except upon the outer side of the device where they are spaced a suitable distance to permit of their being adapted to be used upon the various sized hands of different users. The free edges of these cylindrical finger plates are adapted to be secured to the flexible support or backing 15 in any suitable manner as by stitches which can be passed through perforations or under loops 17.

Each cylinder is preferably formed from two segmental pieces which are flanged as shown at 12' and 13' which are adapted to be secured to the outer ends of the sections or members 1 and 2 in any suitable manner as by rivets 18. The flanges 12' fit upon opposite sides of the member 2 as shown more particularly in Fig. 6, while the flanges 13' fit between the member 1 and a plate 19 which is thereby held a sufficient distance from the member 1 to form a pocket or recess 20 within which the edge of member 2 is adapted to be forced when the cutter is actuated. The forward edge of the member 2 is beveled or inclined and sharpened as shown at 21 to form a cutting edge which is adapted to sever the stem of the fruit whenever the cutter is closed. The edge of the member 19 projects outward substantially even with the edge of the member 1 and is preferably serrated or provided with teeth 22 which are adapted to engage with the stem of the fruit and prevent its slipping outward when the blade or cutter 2 is being closed. These teeth or serrations may be formed in any suitable manner as by means of scallops or recesses 23. The outer edge of the member 1 is also preferably beveled as at 24 to assist in severing the stem. The outer end of the member 2 is preferably notched so as to form a shoulder 25 which is adapted to engage with a suitable stop on the member 1 as a small piece of metal 26 that is secured between the member 1 and the plate 19 to hold them at the proper distance apart, said stop being of the thickness of the two flanges 13'.

If desired means may be provided for preventing the bolt 3 from turning as by slotting the same and providing a key 27 which is adapted to engage suitable shoulders at the pivot point and thereby hold said pin rigid. The rivet 6 is also adapted to be rigidly secured at the outer end of the shank 4 in any suitable manner as by upsetting it in a hole 28 before or at the time the plate 8 is secured in position.

When a glove 29 is used as shown in Fig. 2 a pad or roll 30 is preferably formed at the outer side of the palm of the hand against which the fruit, as an orange 31, is adapted to be forced when the hand is clasped over the fruit preparatory to being cut off. This roll will prevent the fruit from accidentally slipping out of the palm of the hand after it has been severed from the stem by the closing of the clipper or cutter. The glove is preferably secured upon the wrist by means of suitable strap and buckle mechanism 32 in the usual manner and the ends of the fingers are preferably cut off so as to form stalls 33, those upon the thumb and first finger forming a lining for the tubular finger plates in the same manner as heretofore described for the lining 15 formed upon or connected with the strip 9.

By constructing a fruit picker as above described it is evident that the same can be made very compact, the Figs. 3 and 4 of the drawings showing the same substantially full size. The device is adapted to be quickly placed upon one or both hands of the operator and as they are self-contained and rigidly secured to the hand only one hand is required for picking any individual fruit, thereby permitting of the other hand being used for other purposes, as grasping the ladder or where it is provided with another picker it can be used for picking other fruit.
This permits of increasing the capacity of the operator for picking the fruit as it is not necessary to use both hands for picking the same individual fruit as is necessary in picking oranges and lemons with the ordinary shears or cutter.

As the knives or cutting blades are located between the thumb and first finger the pressure of the thumb to actuate the knives in cutting the stem of fruit is as easily applied as though it were used for forcing the handles of the ordinary shears together and by lining the finger plates with a soft and yielding material the danger of injuring the thumb or finger in operating the cutter is avoided. By beveling the edges of the cutting members the stem of the fruit is given a slight bevel or angle in cutting which facilitates the passage of the blade through the stem and thereby decreases the force necessary to operate the device.

As the cutting blades of the picker are located between the thumb and finger the pivot point where the two members are secured together is located substantially in the crotch between the thumb and finger and the off-set 5 permits of the extension or rear end of the shank 4 to extend backward to the plate 8 at the side of the hand, thereby securing a longer point of attachment. The slot in the plate is so arranged that as the blades are opened and closed the rivet in the rear end of the shank will move back and forth in said slot and thereby give a free movement to the cutters.

Having described my invention I claim—
1. In a fruit picker, two scissors-like members, each provided with a finger plate and one member being provided with a rearwardly extending shank, and a hand member secured to the rear end of said shank and to said finger plates.

2. In a fruit picker, two scissors-like cutting members pivotally secured together, each member being provided with a finger plate and one of the members being provided with a rearwardly extending shank, a hand member adapted to be secured to said finger plates, a slotted plate on said hand member at the rear of said shank, and a rivet from said shank through said slot.

3. In a fruit picker, two scissors-like cutting members pivotally secured together and each provided with a finger plate, one of said members being provided with a rearwardly extending shank which is bent into an off-set at the rear of said pivot, a hand member secured to said finger plate, and means for loosely securing the rear end of said shank to said hand member, said means comprising a plate having a slot therein secured to said hand member and a projection on said shank movable in said slot.

4. In a fruit picker, a glove like foundation, having two scissors like members pivotally connected together and secured to the thumb and fore finger portions respectively, one of said members being provided with a rearwardly extending shank, and means for movably connecting the rear end of the shank to said foundation, said means comprising a plate having a slot therein secured to said foundation and a projection on said shank movable in said slot.

In testimony whereof, I have hereunto set my hand at Los Angeles California this 15th day of May 1908.

MAURICE J. KEATING.

In presence of—
 FRANK L. A. GRAHAM,
 F. M. TOWNSEND.